US010030931B1

(12) United States Patent
Black et al.

(10) Patent No.: US 10,030,931 B1
(45) Date of Patent: Jul. 24, 2018

(54) HEAD MOUNTED DISPLAY-BASED TRAINING TOOL

(75) Inventors: Jason M. Black, Orlando, FL (US); Gregory A. Harrison, Oviedo, FL (US); David A. Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 329 days.

(21) Appl. No.: 13/325,924

(22) Filed: Dec. 14, 2011

(51) Int. Cl.
*F41A 33/00* (2006.01)
*G02B 27/01* (2006.01)

(52) U.S. Cl.
CPC .............. *F41A 33/00* (2013.01); *G02B 27/01* (2013.01); *G02B 27/0101* (2013.01)

(58) Field of Classification Search
CPC ......... G06F 3/048; F41A 33/00; G02B 27/01; G02B 27/0101
USPC ............................................................ 434/11
See application file for complete search history.

(56) References Cited

U.S. PATENT DOCUMENTS

| | | | | |
|---|---|---|---|---|
| 5,645,077 A * | 7/1997 | Foxlin | ........................... | 600/587 |
| 5,805,120 A * | 9/1998 | Yamada et al. | ................... | 345/7 |
| 5,856,844 A * | 1/1999 | Batterman et al. | ....... | 348/207.99 |
| 6,176,837 B1 * | 1/2001 | Foxlin | ........................... | 600/595 |
| 6,278,418 B1 * | 8/2001 | Doi | ..................... | 345/7 |
| 6,411,266 B1 * | 6/2002 | Maguire, Jr. | ..................... | 345/8 |
| 6,522,312 B2 * | 2/2003 | Ohshima et al. | ................. | 345/8 |
| 6,757,068 B2 * | 6/2004 | Foxlin | ........................... | 356/620 |
| 6,951,515 B2 * | 10/2005 | Ohshima et al. | ............... | 463/31 |
| 6,972,734 B1 * | 12/2005 | Ohshima et al. | ................. | 345/8 |
| 7,038,699 B2 * | 5/2006 | Sato et al. | ..................... | 345/633 |
| 7,110,013 B2 | 9/2006 | Ebersole et al. | | |
| 7,130,754 B2 * | 10/2006 | Satoh et al. | ..................... | 702/95 |
| 7,395,181 B2 * | 7/2008 | Foxlin | ........................... | 702/155 |
| 7,397,930 B2 * | 7/2008 | Uchiyama et al. | ........... | 382/103 |
| 7,564,469 B2 * | 7/2009 | Cohen | ........................... | 345/632 |
| 7,574,070 B2 * | 8/2009 | Tanimura et al. | ............. | 382/284 |
| 7,610,558 B2 * | 10/2009 | Morita | ........................... | 715/757 |
| 7,995,076 B2 * | 8/2011 | Emam et al. | ................... | 345/633 |
| 8,678,282 B1 * | 3/2014 | Black et al. | ................... | 235/417 |
| 2002/0154070 A1 * | 10/2002 | Sato et al. | ........................ | 345/8 |
| 2004/0002843 A1 * | 1/2004 | Robarts et al. | ................. | 703/13 |

(Continued)

OTHER PUBLICATIONS

Silva et al., "Introduction to Augmented Reality," Technical Report #25, LNCC, 2003, Brazil, National Laboratory for Scientific Computation, 11 pages.

*Primary Examiner* — Robert J Utama
(74) *Attorney, Agent, or Firm* — Withrow & Terranova, PLLC (57) ABSTRACT

A head mounted display (HMD)-based training tool includes a HMD, sensor components, and electronics components. The sensor components include an external environment sensor for obtaining data of a real training scene. The electronics components include a simulator including at least one processor coupled to receive the real training scene data. The simulator generates virtual image data based on simulator input signals, where the virtual image data represents at least one virtual object. A display device is coupled to receive the virtual image data from the simulator. A field of view (FOV) of the HMD includes the virtual object from the display device and a real-world view of the real training scene, wherein the simulator modifies the virtual image data responsive to changes in the simulator input signals.

23 Claims, 9 Drawing Sheets

(56) References Cited

U.S. PATENT DOCUMENTS

| | | | |
|---|---|---|---|
| 2004/0095311 A1* | 5/2004 | Tarlton et al. | 345/156 |
| 2004/0201857 A1* | 10/2004 | Foxlin | 356/620 |
| 2005/0159916 A1* | 7/2005 | Anabuki | 702/151 |
| 2008/0111832 A1* | 5/2008 | Emam et al. | 345/633 |
| 2009/0187389 A1 | 7/2009 | Dobbins et al. | |
| 2012/0212499 A1* | 8/2012 | Haddick et al. | 345/589 |

* cited by examiner

HEAD MOUNTED DISPLAY-BASED TRAINING TOOL

CROSS REFERENCE TO RELATED APPLICATIONS

Copending Non-Provisional patent application Ser. No. 13/304,780 filed Nov. 28, 2011, entitled "AIM ASSIST HEAD-MOUNTED DISPLAY APPARATUS" and assigned to Lockheed Martin Corporation.

FIELD

Disclosed embodiments relate to the field of augmented reality, and more particularly to augmented reality head mounted display-based devices for training activities that can involve munitions, such as military training or target practice.

BACKGROUND

Conventional training for individual trainees against terrorist scenarios, high-jacking, or for the battlefield involves objects with a small confined area of movement within a facility using live ammunition. Issues with such training include possible casualties from live ammunition and canned movements the trainee can sense.

Some conventional live training systems utilize virtual objects in a confined area that use real targets, or project computer generated images of virtual objects on surfaces such as walls. Such training systems use sensors attached to walls or ceilings for capturing movements of trainees and provide results from a trainee' actions (e.g., firing a weapon).

SUMMARY

Disclosed embodiments include augmented reality (AR) head mounted display (HMD)-based training tools that include a head mount for the placement and securing of a HMD on the head of a trainee, such as a helmet, frame, strap, goggles or other structure suitable for supporting the HMD in a generally fixed established relationship with the eyes of a trainee. The training tool includes a multi-functional package including a sensor component, an electronics component, and an optional communications component.

The sensor component of the multi-functional package includes an external environment sensor that tracks real training scene data including real objects and individuals that are detected in the training scene. The electronics component includes a simulator comprising a processor or other computing device that is coupled to the external environment sensor to receive and process the real training scene data. The simulator generates virtual image data based on simulator input signals including the real training scene data, where the virtual image data represents at least one virtual object. The optional communications component comprises a receiver or transceiver coupled to an antenna, where the receiver or transceiver is coupled to the simulator.

The HMD includes a display device that provides the rendered virtual image data within the field of view (FOV) for viewing by the trainee, where the display device is coupled to receive the virtual image data from the simulator. The FOV provided also includes a real-world view of the training scene, being provided by a camera in one embodiment and is a direct real-world view of the training scene in another embodiment. A system for determining position and orientation of the HMD is coupled to the simulator. The FOV thus includes an AR image for the trainee comprising the virtual object positioned in the real-world view of the training scene. The simulator modifies the virtual image data responsive to changes in the simulator input signals received.

Disclosed HMDs thus generate images including the real-world scene and at least one virtual object, and optionally can also generate sounds to provide trainees a more realistic situation as compared to the conventional trainee' training described above. Essentially any virtual object can be presented to the trainee in the HMD's FOV, such as rocks, enemy combatants or soldiers.

In one training application using a disclosed HMD-based training tool for example, the trainee can aim a real weapon at a virtual object (e.g., enemy soldier) in a training scene, fire the weapon (with live ammunition in one embodiment) at the virtual object in the scene, eliminate the virtual object, and then continue on course. Multiple trainees can see the same virtual objects and their motions at the same time. Training system are also disclosed including a plurality of trainees each having disclosed training tools, and in one embodiment a training coordinator initiates presentation of one or more virtual objects within the HMD's FOV of the trainees at any time during the training.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments include HMD-based training tools that combine a simulator with an AR HMD that enables training activities including target practice in a controlled or uncontrolled, monitored, or unmonitored environment. Such training tools can include all the respective components on the HMD, or some components on the HMD and some components on the body of the trainee, to thus provide a fully mobile training tool.

Live training or target practice is implemented on virtual elements/objects (e.g., enemy soldiers, or enemy vehicles) generated by a simulator enabled by an external environment sensor that tracks an environment associated with a real training scene including real objects and individuals in the training scene. Disclosed training tools do not have to be confined to a particular space, and thus allow the trainee(s) to be anywhere at any time. Moreover, such training tools eliminate the need for conventional external sensors (related to training in a confined space).

Disclosed HMD-based training tools can also provide multi-mode operation, such as a first mode being a normal (non-training) mode of operation suitable for in-field operations, and a second mode being a training mode. While in the training mode, such as when at a training facility, disclosed HMD-based training tools can include multi-functional modes that include a preloaded training system mode (no training instructor interaction), a hybrid mode that comprises a preloaded training system mode with a trainer interaction mode (training instructor available), or a pure trainer interaction mode enabling the training instructor to exclusively add the virtual objects to the HMD FOV for the trainees throughout the training.

Figure 1A:
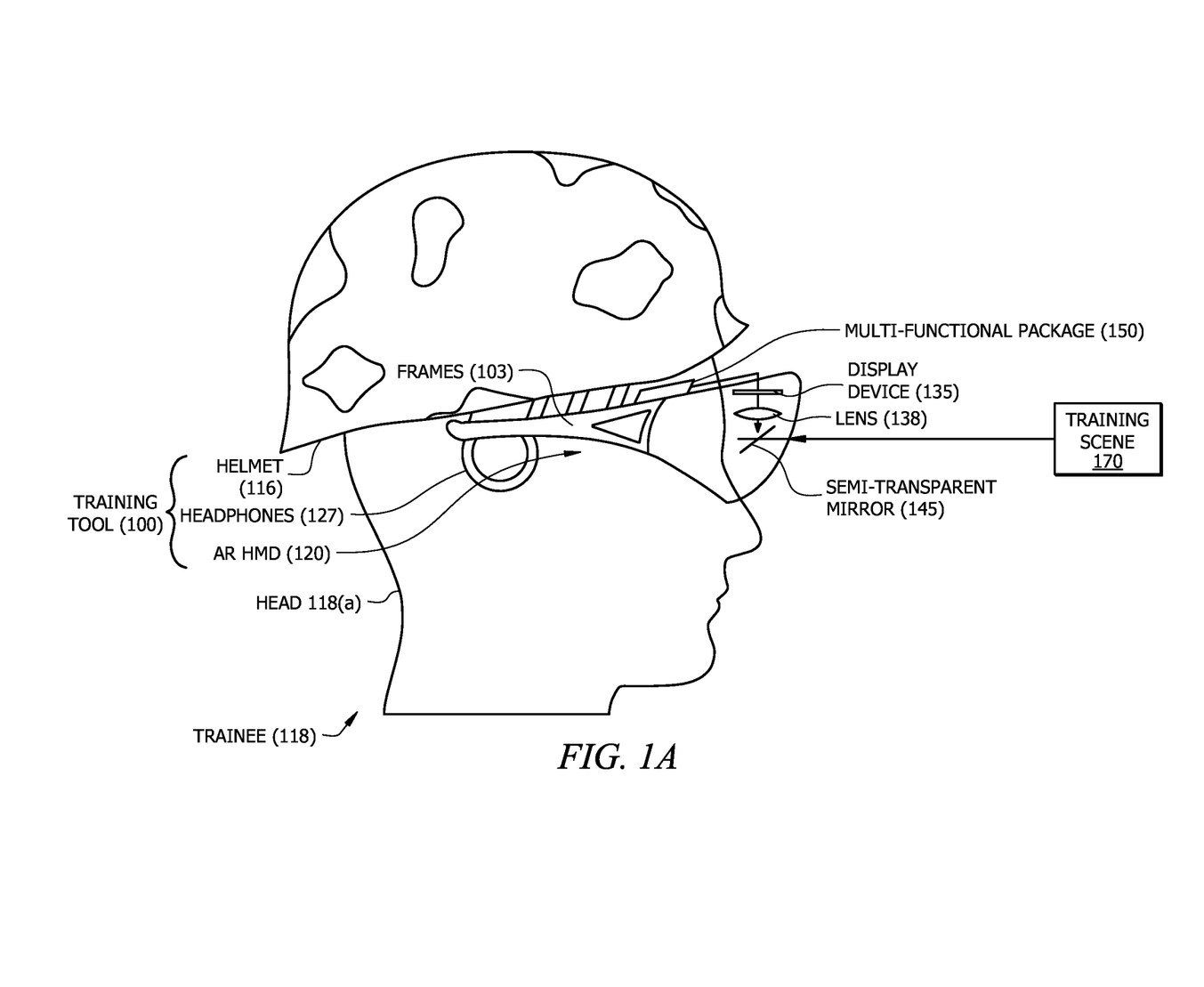
FIG. 1A is a depiction of an example augmented reality (AR) HMD-based mobile training tool for training trainees including a HMD comprising a multi-functional package including sensor components and electronics components that modifies virtual image data responsive to changes in simulator input signals, according to an example embodiment.
Figure 1B:
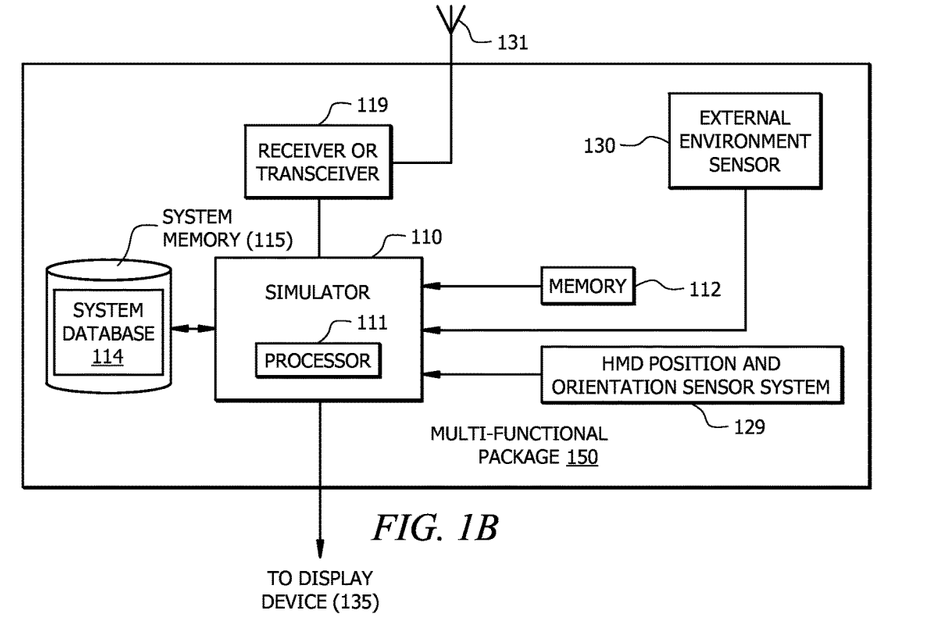
FIG. 1B is a block diagram representation of an example multi-functional package including sensor components, electronics components including a simulator, and optional communication components, according to an example embodiment.

FIG. 1A shows a depiction of an AR HMD-based training tool 100 including an AR HMD 120 shown as an optical see-through HMD comprising a multi-functional package 150 including sensor components and electronics components that generates updatable virtual image data responsive to simulator input signals that can change over time, according to an example embodiment. FIG. 1B is a block diagram representation of an example multi-functional package 150 including sensor components, electronics components comprising a simulator, and optional communication components, according to an example embodiment.

The ray trace for the real world view of the training scene 170 is shown directly reaching the eyes of the trainee 118. However, disclosed embodiments also include HMD mirrors that enable indirect ray trace paths for providing the real world view of the training scene 170 to the trainee 118. Although depicted on the HMD 120, the multi-functional package 150 can be at least partially embedded into the frames 103 of the HMD 120, or one or more components of the multi-functional package 150 can be provided on the body of the trainee 118. Moreover, although a power supply (e.g., a battery) is not shown in FIG. 1A or other FIGS. herein, some power supply or power supplies are provided for providing power for the components of the training tool 100 that require power for their operation.

The training tool 100 comprises a head mount shown as helmet 116 for placement on a head 118(a) of a trainee 118 (e.g., military trainee) for securing the HMD 120 to provide a fixed relationship between the HMD 120 and the eyes of the trainee 118. The head mount may also comprise a frame, strap, goggles or other structure suitable for supporting the HMD 120 in a generally fixed established relationship with respect to the eyes of the trainee 118.

As shown in FIG. 1A, a semi-transparent mirror 145 is coupled to receive virtual image data from a display device 135 through lens 138 that is generated by simulator 110 (shown in FIG. 1B) and directs the rendered virtual image to the eyes of the trainee 118, together with a direct real-world view of the training scene 170. HMD 120 can include another lens analogous to lens 138, frames 103, etc. that may be viewable from the other side of the head 118(a) of the trainee 118.

HMD 120 in FIG. 1A is thus an optical-see-through HMD. However, disclosed training tools can also comprise video-see-through HMDs, such as by adding a camera to the sides or the front of the HMD 120, for obtaining a real world image of the training scene 170 and placing a display device in the FOV of the trainee that displays both the real world view of the training system and the computer generated virtual image. Moreover, the HMD 120 can also utilize other arrangements including a transparent display (e.g., OLED) or a contact lens application HMD, rather than the semi-transparent mirror 145 shown.

The training tool 100 is also shown including headphones 127. Headphones 127 can provide sounds to the trainee 118 to create a more realistic situation as compared to the conventional trainee' training described above, such as speech generation from a virtual individual in the training scene 170. The sensor components of AR HMD 120 shown in FIG. 1B comprise an external environment sensor 130 for tracking and obtaining real training scene data from the training scene 170 including data representing real objects and individuals that are detected in the training scene 170, and a HMD position and orientation sensor system (sensor system) 129 for determining position and orientation of the HMD 120, that are both shown coupled to the simulator 110.

The external environment sensor 130 can comprise a position detection system that establishes the location and orientation of real objects and individuals in the training scene 170. For example, the external environment sensor 130 can comprise a light detection and ranging (LIDAR) device, radar, or at least one camera. Two or more cameras can provide stereoscopic images. In one embodiment the external environmental sensor 130 comprises a first and a second camera, with the first of these cameras mounted on the HMD 120 on one side of the head of the trainee, with the second camera mounted on the HMD 120 on other side of the head. The external environment sensor 130 can also comprise a device for recognizing gunfire for determining when the weapon is fired by the trainee, such as a sound detector in the case of live ammunitions, a micro-trigger sensor on the weapon, or a muzzle flash detector for detecting triggering.

Sensor system 129 for determining position and orientation of the HMD can in one embodiment comprise a Global Positioning System (GPS)-aided Inertial Navigation System (INS) that comprises both an INS and a GPS. An INS is a navigation system that uses a computer, motion sensors (accelerometers) and rotation sensors (gyroscopes) to continuously calculate via dead reckoning the position, orientation, and velocity (direction and speed of movement) of a moving object without the need for external references. A GPS system is a navigation system that uses satellites to act as reference points for the calculation of position location. The INS can comprise accelerometers and gyroscopes that can augment position data from the GPS. The training tool 100 thus has position and orientation data for all six degrees of freedom of the HMD 120 including three degrees of orientation (roll, pitch, yaw) and three degrees of position (x, y and z).

The electronic components of HMD 120 shown in FIG. 1B comprise simulator 110 comprising a processor 111 and an associated memory 112 that is shown coupled to the external environment sensor 130 for receiving the data from the real training scene 170. The associated memory 112 can store simulator input signals, that allows preloaded training programs that generate virtual objects to be preloaded and thus be initiated at a start time of training of the trainee 118. Disclosed embodiments can function in a plurality of different training modes. Such training modes can be based on a preloaded simulation database, such as stored in the system memory 115 having system database 114 shown in FIG. 1B. Alternatively, or in combination, virtual objects for display in the FOV of the HMD can be initiated remotely by remotely located individuals, such as training observers, that have wireless transmitters that can transmit simulator input signals to simulator 110 via receipt by the antenna 131 and receiver or transceiver 119 shown in FIG. 1B.

Memory 112 can also store information related to the type of weapon (see FIG. 2 and associated specification for a weapon description) held by the trainee 118, as ammunition information and/or ammunition ballistics, such as ballistic characteristics of one or more types of bullets or other projectiles that the trainee 118 may be firing during training. However, the ammunition information and ammunition ballistics may be pre-stored in memory 112, be provided by devices on a real weapon in the training scene, or be provided by some other source via wired or wireless communications to the HMD 120.

The simulator 110 is operable for generating virtual image data based on simulator input signals, including data of the real training scene 170 provided by the external environment sensor 130. The virtual image data generated represents at least one virtual object. The simulator 110 modifies the virtual image data responsive to changes in the simulator input signals, such as received from one or more of the external environment sensor 130, the HMD position and orientation sensor system 129, memory 112, and receiver or transceiver 119. For example, in operation, the training tool 100 can regularly update the AR image in the FOV responsive to changes in the training scene 170, or movements or actions (e.g., firing a weapon) by the trainee 118. For example, in one specific embodiment, a new AR image can be generated 30 to 60 times per second. In an example training scenario, a virtual terrorist is made to appear in the AR image displayed in the FOV from a training routine stored in memory 112, or information received from a remote source by the receiver or transceiver via antenna 131, the trainee 118 then shoots his or her weapon, and upon the training tool 100 calculating an endpoint that hits the virtual terrorist (aim assist is described relative to FIG. 2), the virtual terrorist is removed from the scene displayed in FOV of the HMD.

The communication components of HMD 120 shown in FIG. 1B comprise an antenna 131 coupled to a receiver or transceiver 119 for receiving wireless training signals from a remote transmitter. An output of the receiver or transceiver 119 is coupled to the simulator 110. As noted above, training signals received via antenna 131 can provide a portion of the simulator input signals for the simulator 110, such as training signals sent by a training coordinator.

Memory 112 can comprise volatile memory while the system memory 115 is generally non-volatile memory so that the system database 114 will survive a power reset or power outage. The system database 114 generally contains long-term (fixed) data that can be loaded or queried, while the memory 112 generally stores dynamic short-term tactical data concerning other entity positions and various immediate information and visual representations.

As described above, in field operation of training tool 100, one or more trainees 118 can receive virtual objects in their HMD's FOV, such as targets pre-loaded from (local) memory 112, or sent by wireless transmission, such as by a training coordinator. Virtual objects such as virtual targets will have relevance to the real terrain in the training scene 170 and the location of the trainee 118. If two trainees 118 have line of sight of the virtual target, then both can see the same virtual target in the FOV. If one trainee fires at the virtual target and is determined by the external environment sensor 130 to hit it, the reaction of the target being hit can also be displayed in the FOV associated with the other trainee. This can be implemented, for example, by configuring the HMDs to have wireless communication from one to another for transferring and receiving the simulated data of the target in the training scene 170.

The program run by processor 111 can thus recognize the position and optionally the orientation of the trainee 118 through devices such as a GPS and optional INS, and thus not depend on external sensors as in conventional training systems. The same type of absolute geospatial position information, such as is obtainable based on GPS technology, can be used to track the position of multiple trainees in a training exercise, which can be provided to other trainees.

In one embodiment the training tool 100 includes a weapon orientation application for determining whether a virtual target in the training scene 170 is hit when the trainee's weapon is fired. The virtual target can be a stationary target or a moving target. Such a system can comprise a variety of technologies that precisely establish position including both location and orientation of items in the training scene 170, including locations of the HMD, the weapon, and target(s), including accounting for movement of the HMD, the weapon or the target(s).

One particular example of a weapon orientation application is referred to herein as "aim assist" application that can be based on determining the trainee's weapon's position, orientation and trajectory, such as based on a position and orientation detection system comprising a GPS (e.g., differential GPS) and an INS, and the ballistics of the ammunition used by the trainee. The aim assist application can provide a crosshair within the FOV for the trainee and target data that can be used to determine whether or not a virtual target is hit when a weapon (held by the trainee 118 or another trainee) is fired, and is described in detail below relative to FIG. 2.

Figure 2:
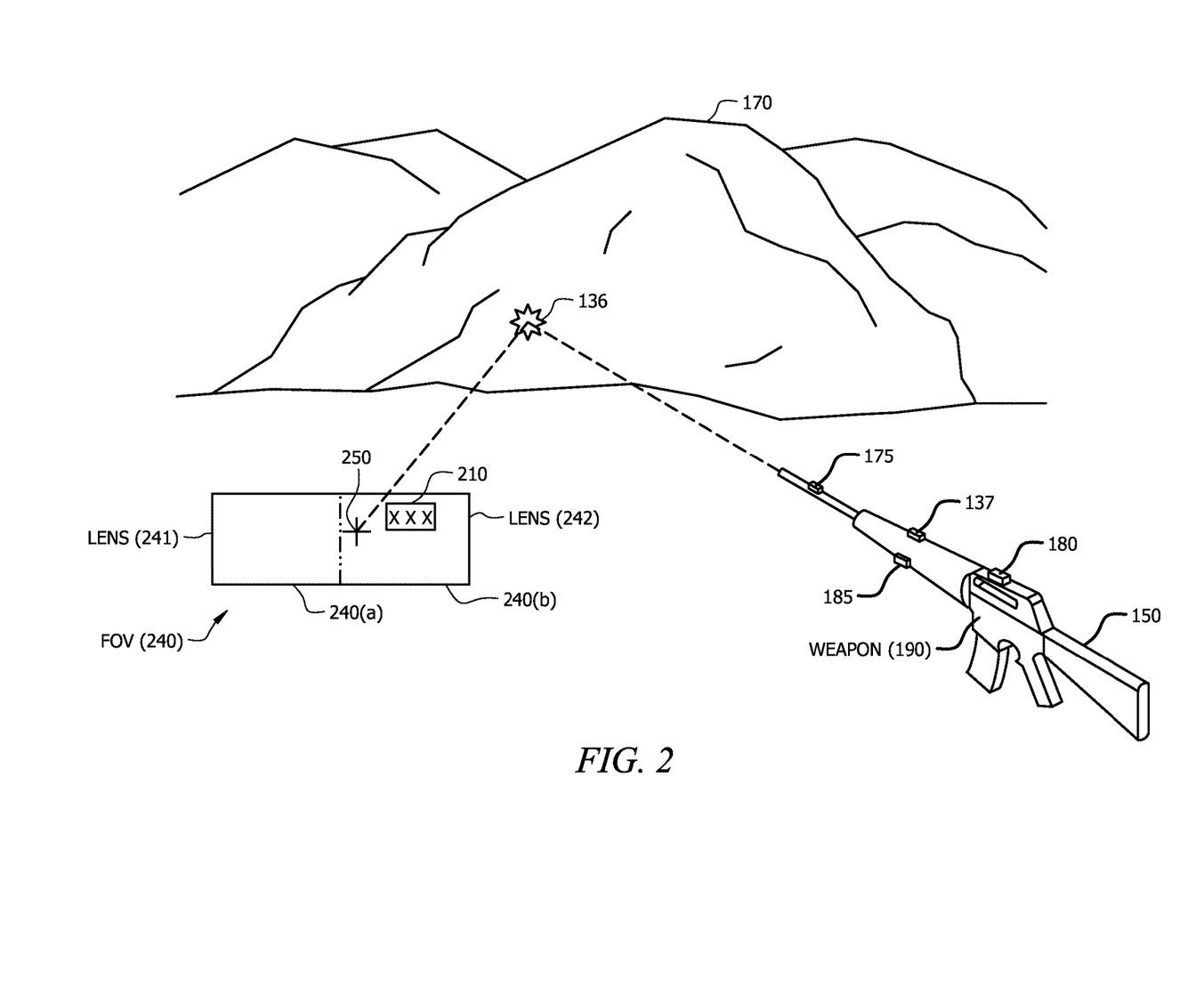
FIG. 2 depicts an example FOV for a disclosed AR HMD-based training tool that includes an aim assist application shown together with a weapon that is held by the trainee according to an example embodiment.

In FIG. 2, the FOV 240 for a disclosed AR HMD-based training tool such as based on HMD 120 that includes a weapon orientation application such as an aim assist application is shown together with a weapon 190 that is held by the trainee, according to an example embodiment. The FOV 240 is provided by a first lens 241 that provides a FOV 240(*a*) for one eye and another lens 242 that provides a FOV 240(*b*) for the other eye of the trainee, that allows a real-world view of the training scene 170 to be provided including the actual terrain where the trainee is located.

Shown in the FOV 240 is text 210 and an icon 250 shown as a crosshair. The processor 111 shown in FIG. 1B can be used to generate data that allows the trainee to view text 210 and icon 250. Reference number 136 illustrates an expected endpoint (also sometimes called an impact point or final destination) of the ammunition of the weapon 190 after firing by the trainee.

As disclosed above, HMD 120 in one embodiment includes an antenna 131 and receiver or transceiver 119 at least partially embedded in a frame 103 of the HMD 120 or separate processor to receive the weapon's position and orientation from the weapon 190. The processor 111 can calculate the endpoint of the ammunition (including real ammunition) shot from weapon 190. If the processor 111 determines the target was hit, the processor 111 can also determine a score for the trainee that is a function of a position on the target hit by the ammunition, such as different scores for head, torso and limb shots, and can display the score for the trainee or other individuals in the training exercise, and optionally also store the scores during a training exercise.

The HMD 120 may also receive or have stored information in memory (such as memory 112 described above) related to the type of weapon, ammunition information and/or ammunition ballistics. Weapon 190 in one embodiment includes a transmitter or transceiver and antenna (collectively shown as 185) to transmit the weapon orientation and position information to the processor 111 of the HMD 120, or to a separate processor that is coupled to the HMD 120.

The ammunition information and ammunition ballistics may be pre-stored, provided by the weapon 190, or be provided by some other source via wired or wireless communications. Processing to correlate the location information to the terrain being viewed, may be performed in the HMD 120, such as by a processor 111 or other electronic calculating device. The icon 250 can then placed in the FOV 240 to correspond to actual location 136 in the view of the real terrain in the training scene 170. In various embodiments, the icon 250 may be placed in one viewing area, or in both (for viewing by both eyes of the trainee).

The sensor system 137 shown in FIG. 1B can determine the position and orientation of the HMD 120. As described above, sensor system 129 can comprise an INS (e.g., gyroscopes and accelerometers) and a GPS. The orientation information may be used in conjunction with absolute geospatial position coordinates or information regarding the HMD 120 (e.g., from GPS) to correlate the view of the actual terrain within training scene 170 with the sensed weapon location absolute geospatial position information and properly position the symbol. The location and orientation information of the weapon 190 and the HMD 120 can comprise x, y, and z positional coordinates and orientation coordinates (such as, roll, pitch, and yaw) of the viewing area in one embodiment.

The external environment sensor 130, such as comprising one or more cameras, such as one camera on each side of the trainee's head, may also be supported on the frame 103, can provide image information which may be used to calibrate the orientation information to ensure that the information correlates well to the terrain being viewed. Such calibration may account for normal drift inherent in some gyroscopes.

In one embodiment, the weapon 190 may have a position and orientation sensor system, shown as position and orientation sensor system 137 that can be analogous to the sensor system 129 shown in FIG. 1B for determining position and orientation of the weapon 190. The position and orientation information may include absolute geospatial position coordinates or information regarding the weapon 190 to correlate the FOV 240 provided by the HMD with the sensed weapon location absolute geospatial position information to properly position the icon 250 in the FOV 240. The location and orientation information for weapon 190 can comprise x, y, and z positional coordinates and orientation coordinates (such as, roll, pitch, and yaw) of the viewing area in one embodiment. The absolute geospatial position coordinates of weapon may alternatively be provided by an external mechanism to calculate the position of the weapon 190.

In one embodiment, the sensor system 137 provides updated position and orientation information at a frequency of at least approximately 60 Hz. In further embodiments, the update may be performed at a slower rate and may still operate well if it uses dead reckoning to update positioning with velocity and acceleration information. In some embodiments, a slower update rate may be used with different mathematical processing such as Kalman filters or dead-reckoning using velocity and acceleration to allow a faster internal position and orientation update while sampling the environment at a slower rate. The HMD receives updated orientation and position of the weapon 190 in order to be able to display the expected endpoint for a specific ammunition ballistic/weapon or endpoint information correctly in the FOV 240.

The camera 175 shown on weapon 190 may be used to provide image information which may be used to calibrate the orientation information to ensure that the information correlates well to the actual terrain in training scene 170 being viewed. Weapon 190 may also include suitable ranging sensors and a processor 180 for calculating the endpoint 136 for ammunition being fired given the position and orientation provided by sensor system 137 and can transmit this information to the HMD using transmitter or transceiver/antenna 185. The endpoint information is provided to the HMD for positioning and display of the icon 250 in the viewing area. Alternatively, the processor 111 of HMD can calculate the endpoint based on position and orientation data regarding the weapon 190 sensed by sensing system 137 provided via transmitter or transceiver/antenna 185.

Image data from the weapon 190 from camera 175 may also be provided to correlate the positioning of the icon 250 relative to the terrain being viewed in the FOV 240. In various embodiments, the weapon 190 and HMD are separate from each other and independently moveable. A separate processor may be provided (not shown) which is separate from the weapon 190 and the HMD. With the weapon fixed on a target, the wearer of the HMD may move their head, and the displayed aimpoint will stay fixed on a calculated endpoint of ammunition of the weapon 190. The weapon 190 may also be moved, resulting in movement of the calculated endpoint and corresponding displayed aimpoint.

In an example training exercise there can be plurality of trainees each having disclosed mobile HMD-based training tools on their head, and a training coordinator for the military trainees. As described above, the training coordinator can wirelessly load or preload a topography/3D map to a training program that can be received by the training tools associated with the HMDs 120. The topography/3D map can be used by the training tools to setup virtual obstacles/targets in places on the map, such as people (friendly or enemy/foe).

The training coordinator can also submit virtual obstacles through wireless communications while the training is taking place.

In one embodiment virtual walls that represent borders/out of bounds areas can be added to the FOV for the trainee, such as colored (e.g., blue) side walls. Thus, if the trainee is in the field a colored virtual side boundary can be set up in the display that alerts the trainee to not shoot beyond the boundary. Such virtual walls can be a safety feature, for example, if there was a village or a road nearby.

Figure 3:
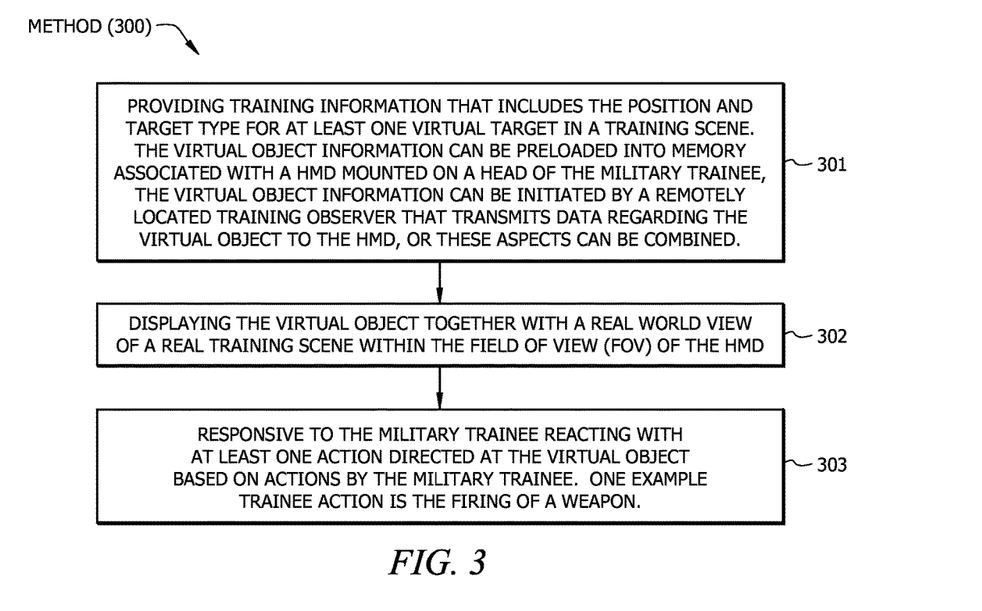
FIG. 3 is a flow chart that shows steps in an example method of training a military trainee having a HMD mounted on a head of the military trainee, according to an example embodiment.

FIG. 3 is a flow chart that shows steps in an example method 300 of training a military trainee having a HMD mounted on a head of the military trainee, according to an example embodiment. Step 301 comprises providing training information that includes the position and target type for at least one virtual target in a training scene. In one embodiment the virtual object information is preloaded into memory associated with the HMD, and the training is initiated automatically from the information stored in the memory. In another embodiment, the virtual object information is initiated by a remotely located training observer that transmits data regarding the virtual object to the HMD. In yet another embodiment, the virtual object information is preloaded into memory associated with the HMD, and virtual object information is also initiated by a remotely located training observer that transmits data regarding the virtual object to the HMD.

Step 302 comprises displaying the virtual object together with a real world view of a real training scene in the trainee's FOV. Step 303 comprises responsive to the military trainee reacting with at least one action directed at the virtual object, modifying the virtual object based on actions by the military trainee. One example trainee action is the firing of his or her weapon.

In one embodiment the virtual object comprises a target and the action comprises firing a weapon at the virtual object, where the HMD includes a processor that calculates an endpoint of the ammunition based on a position and orientation of the weapon, and ballistics of the ammunition to determine whether the target is hit when said weapon is fired. If the processor determines that the target was hit, the processor can determine a score for the military trainee that is a function of a position of the target hit by the ammunition. The HMD can provide a visual indication on the display device of a calculated ammunition endpoint of the ammunition based on the position and orientation of the weapon and ballistics of the ammunition. As described above, the respective AR-HMD-based training tools can interact with another for a multiple training purpose.

As disclosed above, disclosed embodiments can function in a plurality of different training modes. Such training modes can be based on a preloaded (stored) simulation database or a dynamically generated simulation database, such as stored in the system memory 115 shown in FIG. 1B. The dynamically generated simulation database can be an automatically updatable simulation database that reflects new information (i.e., changes) sensed in the training scene shown in the FOV of the HMD worn by the military trainee, whether the new information is real information or virtual information, and whether the simulation database is pre-loaded or not. For example, in the case of new real information within the real training scene, the new information in the real training scene can be sensed by a suitable sensor, such as an optical sensor, and the FOV of the HMD displayed for the military trainee can be modified to reflect the new information. In applications having a plurality of trainees each having a disclosed HMD-based training tool, each trainee can have their own the dynamically generated simulation database that is updated during training. The initial database load for each trainee can be identical, but may start to diverge as the training exercise continues and new terrain data and other entity position data unique to each trainee is sensed by each disclosed HMD-based training tool. One training mode is based on pre-stored scenes that allows the trainee wearing a disclosed HMD to engage in shooting practice, such as using the aim assist principles described above. This training mode can track the shooting performance and perform scoring to reflect the shooting performance of the trainee. AR objects can be added to the FOV of the trainee's HMD based on pre-loaded (stored) stored training scenes, or scenes having AR objects can be downloaded to the FOV of the trainee's HMD (such as from actions by a training instructor) in essentially real-time.

Another training mode can be based on scanning the environment around the trainee, saving the scanned environment data as a real training scene and creating a simulation based on the real training scene, selecting targets, and the trainee practicing shooting using disclosed aim assist principles. AR object(s) can be added to the training scene displayed in the FOV of the trainee's HMD.

Another training mode allows other participants (e.g., military trainees) to be included in the simulation, which allows team-based training with optional scoring. In this embodiment if one military trainee "kills" a target, the target can be removed from the simulation for all of the trainees.

Figure 4:
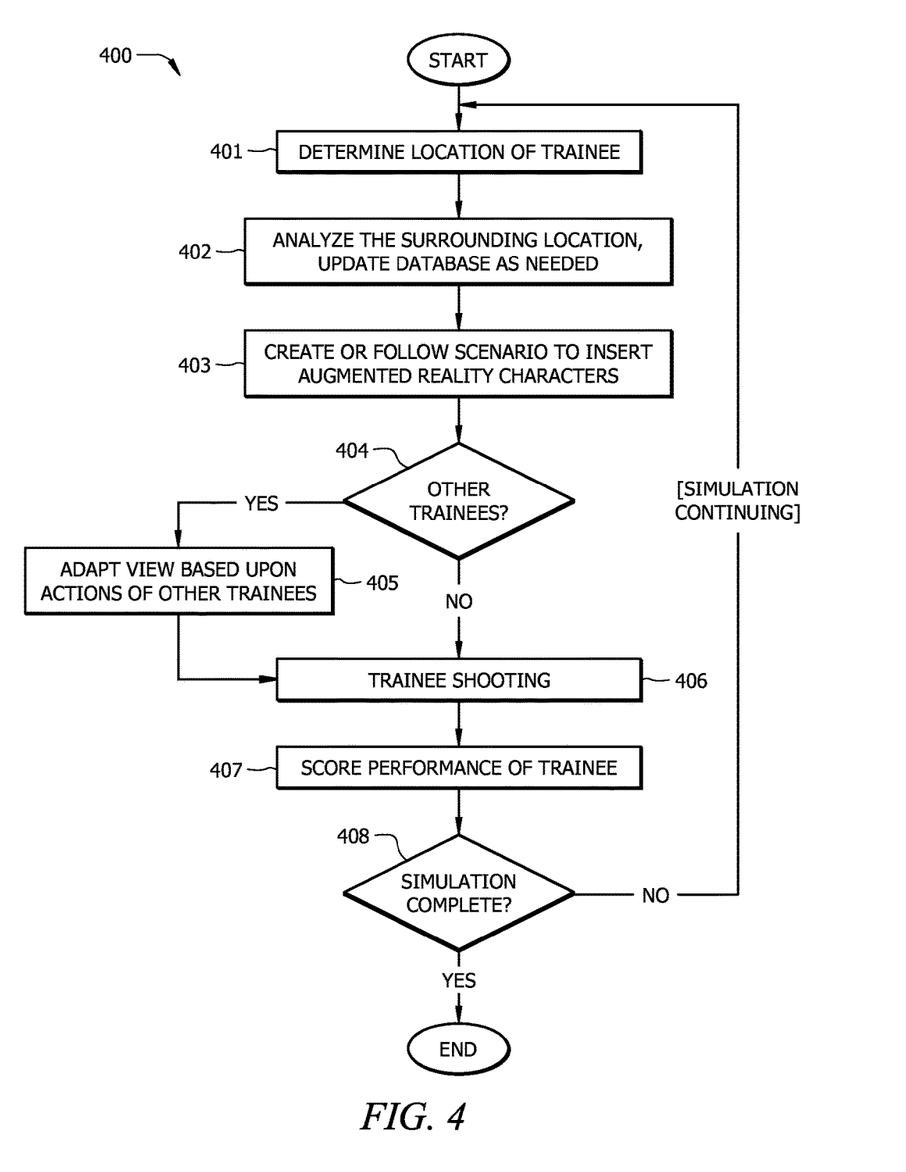
FIG. 4 is a flow chart that shows steps in an example method of training military trainee that shows how a disclosed training tool can update the database upon encountering new information, according to an example embodiment.

FIG. 4 is a flow chart that shows steps in an example method 400 of training at least one military trainee wearing a disclosed HMD that shows how a disclosed training tool can update the database provided to the simulator upon encountering new information, according to an example embodiment. In step 401 the location of a military trainee is determined. Step 402 comprises analyzing the sensed surrounding location relative to the trainee's location. The surrounding location may be sensed by a variety of different means including optical, radar, sonar or through information received from neighboring HMDs worn by other trainees, and the simulation database may be updated as needed to reflect any new sensed information.

Step 403 comprises creating or following a simulation scenario that inserts one or more AR reality objects (e.g., characters) into the FOV of the military trainee's HMD. As noted above, AR objects can be added to the FOV of the trainee's HMD based on pre-loaded (stored) training scenes when following a simulation scenario, or scenes having AR objects can be downloaded to the FOV of the trainee's HMD in essentially real-time in embodiments where the simulation scenario is created (not stored).

Step 404 is a decision step which considers whether or not there are other military trainees present in the training scene. If there are other trainees present, the FOV in the trainee's HMD can be adapted to reflect actions of other trainees before the trainee performs shooting in step 406. For example, if one military trainee "kills" a target, the target can be removed from the simulation for all of the trainees.

If there are no other military trainees present, the method advances directly to step 406 where the military trainee performs shooting. Step 407 comprises scoring the shooting performance of the military trainee. Step 408 is a decision step which considers whether the simulation is completed. If the simulation is not completed, the method returns to step 401 and steps 401 to 408 are repeated.

EXAMPLES

Disclosed embodiments are further illustrated by the following specific Examples, which should not be construed as limiting the scope or content of this Disclosure in any way.

In one training scenario, two trainees (A and B) are hiding behind an object (e.g., crouching). Both trainees look over an object and see a simulated enemy/target in the display device firing a weapon at them. Both individuals duck down behind cover once again. Individual A gets up and hits the simulated target with ammunition shot from A's weapon. The simulated target falls to the floor. Individual B now exits from behind cover and sees the simulated target on the ground in his display device.

Figure 5A:
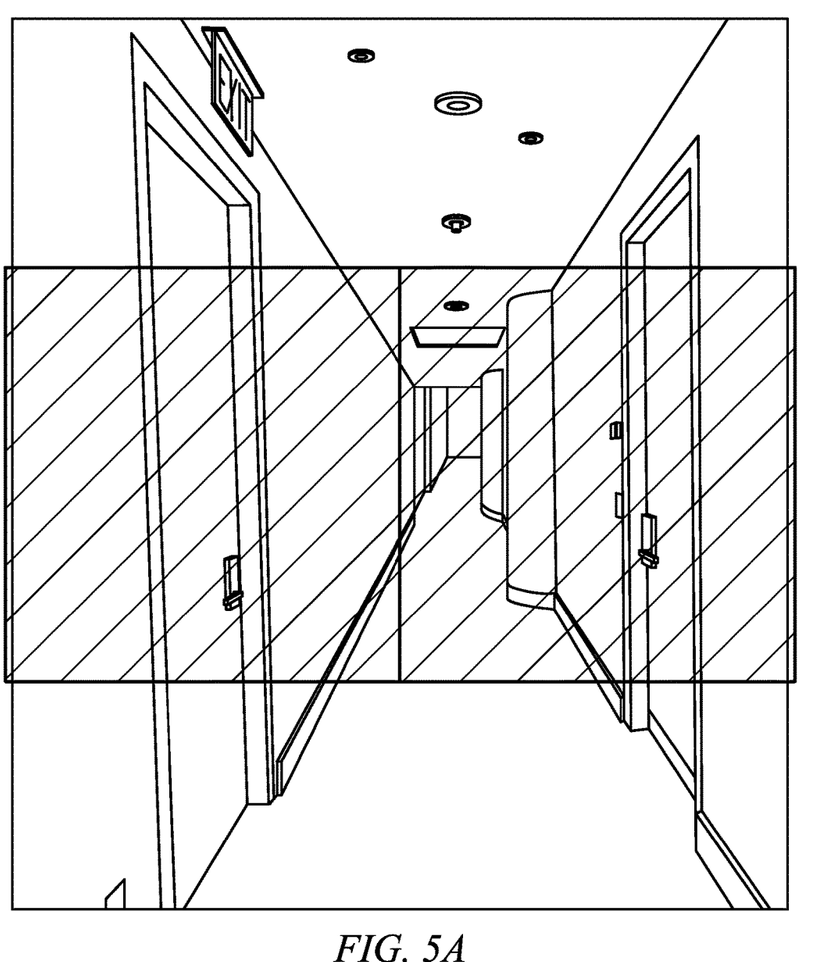
FIGS. 5A-D show example successive depictions during training of a military trainee having a HMD mounted on a head of the military trainee, where the trainee fires his or her weapon responsive to the appearance of a virtual target in their FOV, according to an example embodiment.
Figure 5B:
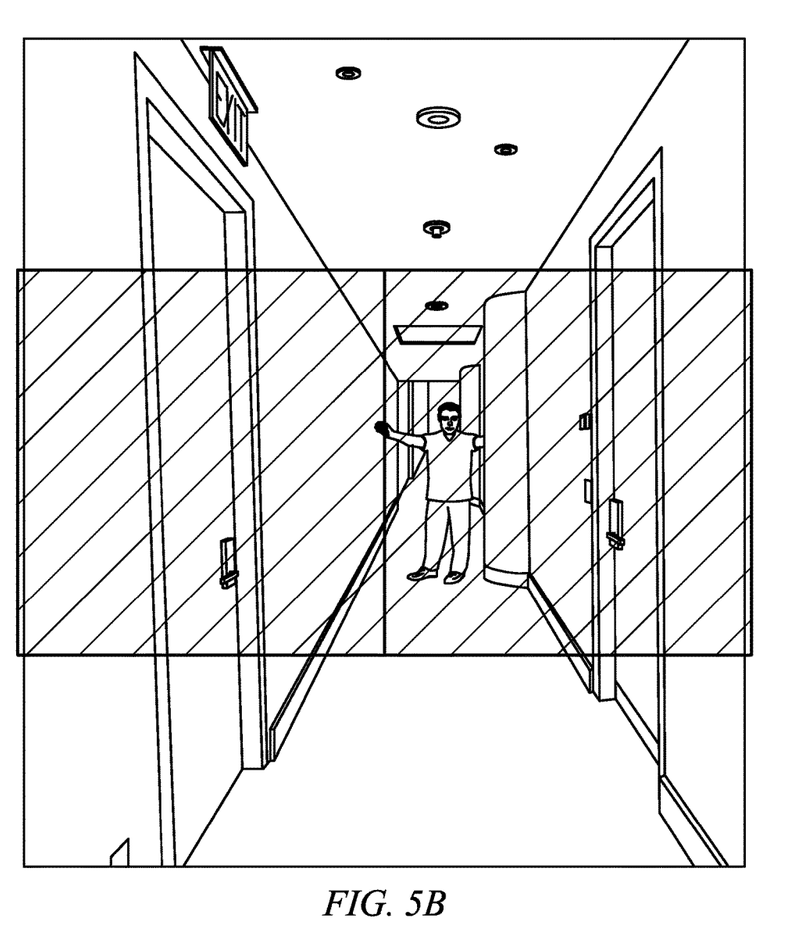
Figure 5C:
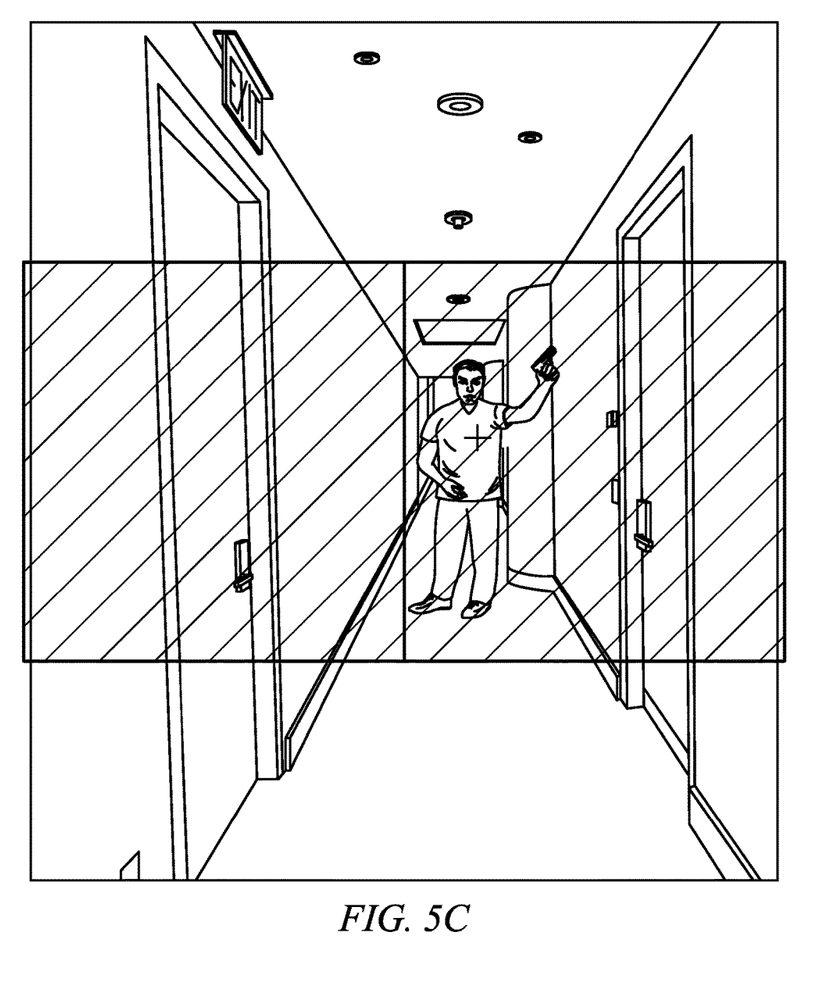
Figure 5D:
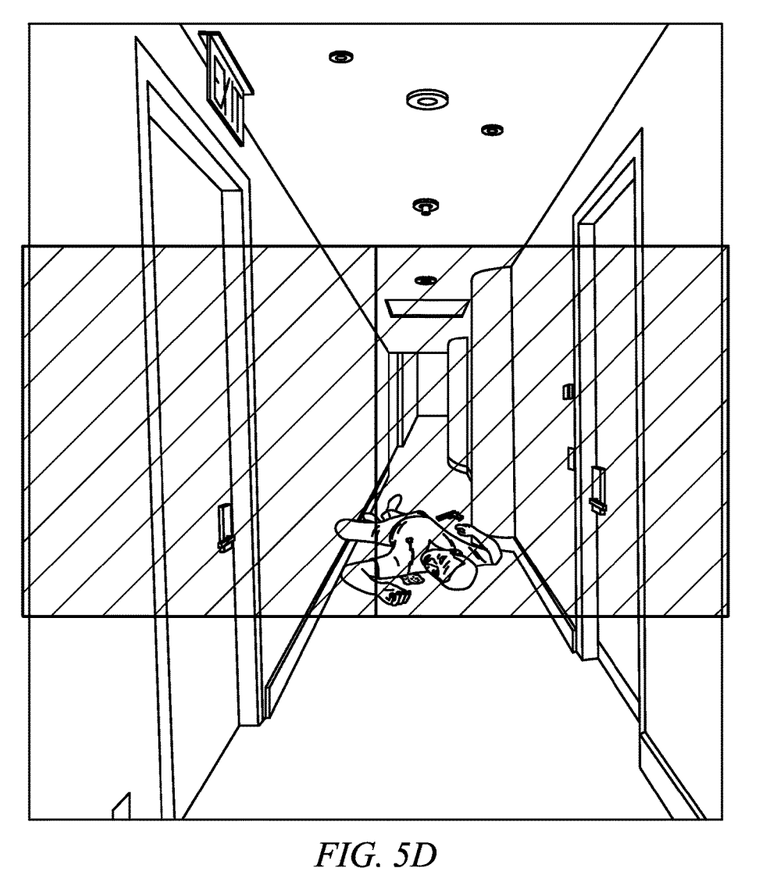

FIGS. 5A-D show example successive depictions during training of a military trainee having a HMD on a head of the military trainee, where the trainee fires his or her weapon responsive to the appearance of a virtual target in their FOV, according to an example embodiment. The depiction in FIG. 5A illustrates the image in the trainee's FOV before the additional of a virtual target to the FOV. The depiction in FIG. 5B illustrates the image in the trainee's FOV after a virtual target appears in FOV, such as from behind the column shown. The only difference between the depictions in FIGS. 5B and 5A is the virtual target in the trainee's FOV. The depiction in FIG. 5C illustrates the image in the trainee's FOV after the virtual target has pulled out a gun. Using the trainee's own weapon (e.g., gun) and weapon location and orientation data sent to the HMD, the crosshair shown is projected into the FOV on the body of the target. The depiction in FIG. 5D illustrates the image in the trainee's FOV after the trainee fired his or her weapon and the HMD calculates that the target was struck, and as a result the target falls to the floor as if it were actually hit.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

We claim:

1. A training tool, comprising:
a head mount for securing a head mounted display (HMD) on a head of a trainee, wherein said HMD comprises:
an external environment sensor configured to:
wirelessly detect, in a real training scene, an existence of a real object that is not attached to a sensor;
determine position information that identifies a position of the real object in said real training scene; and
update a database to add the real object to the database, wherein adding the real object comprises storing in the database object information that identifies the existence of the real object and the position of the real object;
a simulator comprising at least one processor, said simulator configured to generate virtual image data that depicts a virtual object in a particular location based on the position of the real object;
a display device coupled to receive said virtual image data from said simulator; and
a system for determining position and orientation of said HMD coupled to said simulator;
wherein a field of view (FOV) of said HMD includes said virtual object from said display device and a view of said real training scene, and wherein said simulator modifies said virtual image data responsive to changes in simulator input signals.

2. The training tool of claim 1, wherein said external environment sensor further comprises an orientation detection system for obtaining orientation information for said real object in said real training scene.

3. The training tool of claim 2, wherein said external environment sensor comprises at least one of a light detection and ranging (LIDAR) device, radar, and at least one camera.

4. The training tool of claim 1, wherein said external environment sensor further comprises a device for determining that a weapon carried by said trainee and pointed in a direction away from said trainee has been fired based on a sound generated by the weapon or a flash generated by the associated weapon.

5. The training tool of claim 1, wherein said virtual object comprises a target and wherein when said trainee holds a weapon and fires ammunition from said weapon at said target, said processor calculates an endpoint of said ammunition based on a position and orientation of said weapon and ballistics of said ammunition to determine whether said target is hit when said weapon is fired.

6. The training tool of claim 5, wherein if said processor determines said target was hit, said processor provides a score to said trainee that is a function of a position of said target hit by said ammunition.

7. The training tool of claim 5, further comprising a communications package comprising a receiver or a transceiver coupled to an antenna for receiving wireless training signals from a remote transmitter, wherein said receiver or said transceiver is coupled to said simulator, and wherein said wireless training signals are operable to provide a portion of said simulator input signals for said simulator.

8. The training tool of claim 7, wherein said weapon comprises:
a global position system (GPS) and an inertial navigation system (INS) for computing said position and said orientation of said weapon, and a transmitter coupled to an antenna for transmitting data representing said position and said orientation of said weapon to said antenna of said HMD.

9. The training tool of claim 5, wherein said simulator provides a visual indication in said FOV of a calculated ammunition endpoint of said ammunition based on said position and said orientation of said weapon and said ballistics of said ammunition.

10. The training tool of claim 9, wherein the visual indication includes an icon representative of said calculated ammunition endpoint of said weapon and a textual display.

11. The training tool of claim 1, wherein said HMD comprises an optical-see-through HMD including a semi-transparent mirror.

12. The training tool of claim 1, further comprising a memory that stores said simulator input signals that is accessible by said simulator, wherein a timed sequence of said virtual object is preloaded that is initiated at a start time of training of said trainee.

13. A method comprising:
   wirelessly detecting, in a real training scene, by a position detection system in a head mounted display (HMD), an existence of a real object that is not attached to a sensor based on wireless signals received from the real training scene;
   determining position information that identifies a position of the real object in said real training scene based on the wireless signals;
   updating a database to add the real object to the database, wherein adding the real object comprises storing in the database object information that identifies the existence of the real object and the position of the real object;
   generating virtual image data that depicts a virtual object in a particular location based on the position of the real object; and
   displaying in a field of view (FOV) of said HMD the virtual object together with a view of the real training scene.

14. The method of claim 13, wherein said virtual object is preloaded into memory associated with said HMD, and training is initiated automatically from information stored in said memory.

15. The method of claim 13, wherein said virtual object is initiated by a remotely located training observer that transmits data regarding said virtual object to said HMD.

16. The method of claim 13, wherein said virtual object comprises a target and wherein said action comprises firing a weapon at said target, and wherein said HMD includes a processor that calculates an endpoint of ammunition based on a position and orientation of said weapon and ballistics of said ammunition to determine whether said target is hit when said weapon is fired.

17. The method of claim 16, wherein if said processor determines said target was hit, said processor determines a score for a trainee that is a function of a position of said target hit by said ammunition.

18. The method of claim 16, wherein said HMD provides a visual indication in said FOV of a calculated ammunition endpoint of said ammunition based on said position and said orientation of said weapon and said ballistics of said ammunition.

19. The method of claim 13, wherein a plurality of trainees that have their own automatically generated dynamic virtual reality simulation database which diverge from one another as training proceeds responsive to said plurality of trainee's sensed environment in said real training scene.

20. The method of claim 13, further comprising displaying virtual walls that represent borders to said real training scene for alerting a trainee to not shoot beyond said borders.

21. The method of claim 13, wherein said displaying modifies said FOV of said HMD to reflect new information obtained.

22. The method of claim 21, wherein said new information comprises real information within said real training scene.

23. The method of claim 21, wherein said new information comprises virtual information.

\* \* \* \* \*